(12) United States Patent
Belotserkovsky et al.

(10) Patent No.: US 7,697,410 B2
(45) Date of Patent: Apr. 13, 2010

(54) CENTRALIZED BUFFER ARCHITECTURE FOR AN ORTHOGONAL FREQUENCY DIVISION MULTIPLEXING (OFDM) RECEIVER

(75) Inventors: Maxim Borisovich Belotserkovsky, Indianapolis, IN (US); Vincent Demoulin, Pleumeleuc (FR); Louis Robert Litwin, Plainsboro, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 852 days.

(21) Appl. No.: 10/523,442

(22) PCT Filed: Jul. 31, 2002

(86) PCT No.: PCT/US02/24188

§ 371 (c)(1),
(2), (4) Date: Jan. 31, 2005

(87) PCT Pub. No.: WO2004/013999

PCT Pub. Date: Feb. 12, 2004

(65) Prior Publication Data

US 2005/0201267 A1    Sep. 15, 2005

(51) Int. Cl.
*H04J 11/00* (2006.01)
*H04B 1/10* (2006.01)
(52) U.S. Cl. .................. 370/206; 370/210; 375/350
(58) Field of Classification Search .............. 370/206, 370/207, 208, 210, 211, 203, 343; 375/350
See application file for complete search history.

(56) References Cited

U.S. PATENT DOCUMENTS

| | | | |
|---|---|---|---|
| 5,255,290 A | 10/1993 | Anvari | |
| 5,287,067 A | 2/1994 | Denno et al. | |
| 5,581,582 A | 12/1996 | Choi | |
| 5,771,224 A | 6/1998 | Seki et al. | |
| 6,035,003 A | 3/2000 | Park et al. | |
| 6,247,034 B1 * | 6/2001 | Nakai et al. | 708/409 |
| 6,363,084 B1 | 3/2002 | Dejonghe | |
| 6,430,149 B1 * | 8/2002 | Kobayashi | 370/208 |
| 6,549,561 B2 * | 4/2003 | Crawford | 375/137 |
| 6,628,707 B2 * | 9/2003 | Rafie et al. | 375/233 |
| 6,650,617 B1 * | 11/2003 | Belotserkovsky et al. | 370/210 |
| 6,944,244 B2 * | 9/2005 | Belotserkovsky et al. | 375/350 |

(Continued)

FOREIGN PATENT DOCUMENTS

CN    1336737 A    12/2008

(Continued)

OTHER PUBLICATIONS

Search Report Dated Sep. 27, 2002.

(Continued)

*Primary Examiner*—Kwang B Yao
*Assistant Examiner*—Candal Elpenord
(74) *Attorney, Agent, or Firm*—Robert D. Shedd; Vincent E. Duffy; Michael A. Pugel

(57) ABSTRACT

The disclosed embodiments relate to a centralized buffer architecture for an Orthogonal Frequency Division Multiplexing (OFDM) receiver. In this architecture, a central buffer is shared by the main functional blocks or modules of the OFDM receiver. A state machine enables access to the buffer by the functional blocks to maintain buffer coherency.

18 Claims, 3 Drawing Sheets

U.S. PATENT DOCUMENTS

| | | | |
|---|---|---|---|
| 7,027,540 B2 * | 4/2006 | Wilson et al. | 375/354 |
| 7,058,002 B1 * | 6/2006 | Kumagai et al. | 370/203 |
| 2002/0051487 A1 * | 5/2002 | Yamada et al. | 375/232 |
| 2002/0159533 A1 * | 10/2002 | Crawford | 375/260 |
| 2003/0058951 A1 * | 3/2003 | Thomson et al. | 375/260 |
| 2003/0072255 A1 * | 4/2003 | Ma et al. | 370/208 |
| 2004/0001563 A1 * | 1/2004 | Scarpa | 375/326 |
| 2007/0183308 A1 * | 8/2007 | Korobkov et al. | 370/208 |

FOREIGN PATENT DOCUMENTS

| | | |
|---|---|---|
| JP | 11008601 | 1/1999 |
| KR | 19990056424 A | 11/1999 |
| KR | 2002-49790 | 6/2002 |
| WO | WO0233964 | 4/2002 |

OTHER PUBLICATIONS

Correspondence from KR Agent "DeRyook" dated Feb. 18, 2009, pp. 2/3.

\* cited by examiner

US 7,697,410 B2

CENTRALIZED BUFFER ARCHITECTURE FOR AN ORTHOGONAL FREQUENCY DIVISION MULTIPLEXING (OFDM) RECEIVER

This application claims the benefit, under 35 U.S.C. §365 of International Application PCT/US02/24188, filed Jul. 31, 2002, which was published in accordance with PCT Article 21(2) on Feb. 12, 2004 in English.

FIELD OF THE INVENTION

The present invention relates to an improved architecture for Orthogonal Frequency Division Multiplexing (OFDM) receivers.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A wireless LAN (WLAN) is a flexible data communications system implemented as an alternative or extension to a wired LAN within a building or campus. Using electromagnetic waves, WLANs transmit and receive data over the air, minimizing the need for wired connections. Thus, WLANs combine data connectivity with user mobility, and, through simplified configuration, enable movable LANs. Some industries that have benefited from the productivity gains of using portable terminals (e.g., notebook computers) to transmit and receive real-time information are the digital home networking, health-care, retail, manufacturing, and warehousing industries.

Manufacturers of WLANs have a range of transmission technologies to choose from when designing a WLAN. Some exemplary technologies are multicarrier systems, spread spectrum systems, narrowband systems, and infrared systems. Although each system has its own benefits and detriments, one particular type of multicarrier transmission system, orthogonal frequency division multiplexing (OFDM), has proven to be exceptionally useful for WLAN communications.

OFDM is a robust technique for efficiently transmitting data over a channel. The technique uses a plurality of sub-carrier frequencies (sub-carriers) within a channel bandwidth to transmit data. These sub-carriers are arranged for optimal bandwidth efficiency compared to conventional frequency division multiplexing (FDM) which can waste portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals also provides several other advantages over more conventional transmission techniques. Some of these advantages are a tolerance to multipath delay spread and frequency selective fading, efficient spectrum usage, simplified sub-channel equalization, and good interference properties.

Processing OFDM signals requires the manipulation of very large quantities of data. Many functional blocks in typical OFDM receivers require the use of data buffers, which are memory locations that store data for subsequent processing. One exemplary functional block that uses a buffer in OFDM signal processing is the Fast Fourier Transform (FFT) module of a typical OFDM receiver. The FFT module may need a buffer to store incoming data as well as a temporary storage location while the basic computational units of the FFT (known as butterflies) compute the various stages. Another exemplary functional block that uses a buffer in OFDM signal processing is the equalizer module of a typical OFDM receiver. The equalizer module may need a buffer to store the data during the filtering and adaptation process.

The functional blocks or modules of OFDM receivers are typically connected in series so that the output of one functional block goes into a buffer associated with the next functional block. This arrangement takes up space and increases the processing overhead associated with processing OFDM signals. A buffer architecture that avoids these shortcomings would be desirable.

SUMMARY OF THE INVENTION

The disclosed embodiments relate to a centralized buffer architecture for an Orthogonal Frequency Division Multiplexing (OFDM) receiver. In this architecture, a central buffer is shared by the main functional blocks or modules of the receiver. A state machine enables access to the buffer by the functional blocks to maintain buffer coherency.

DETAILED DESCRIPTION OF THE PREFERRED EMBODIMENT

The characteristics and advantages of the present invention will become more apparent from the following description, given by way of example.

Figure 1:
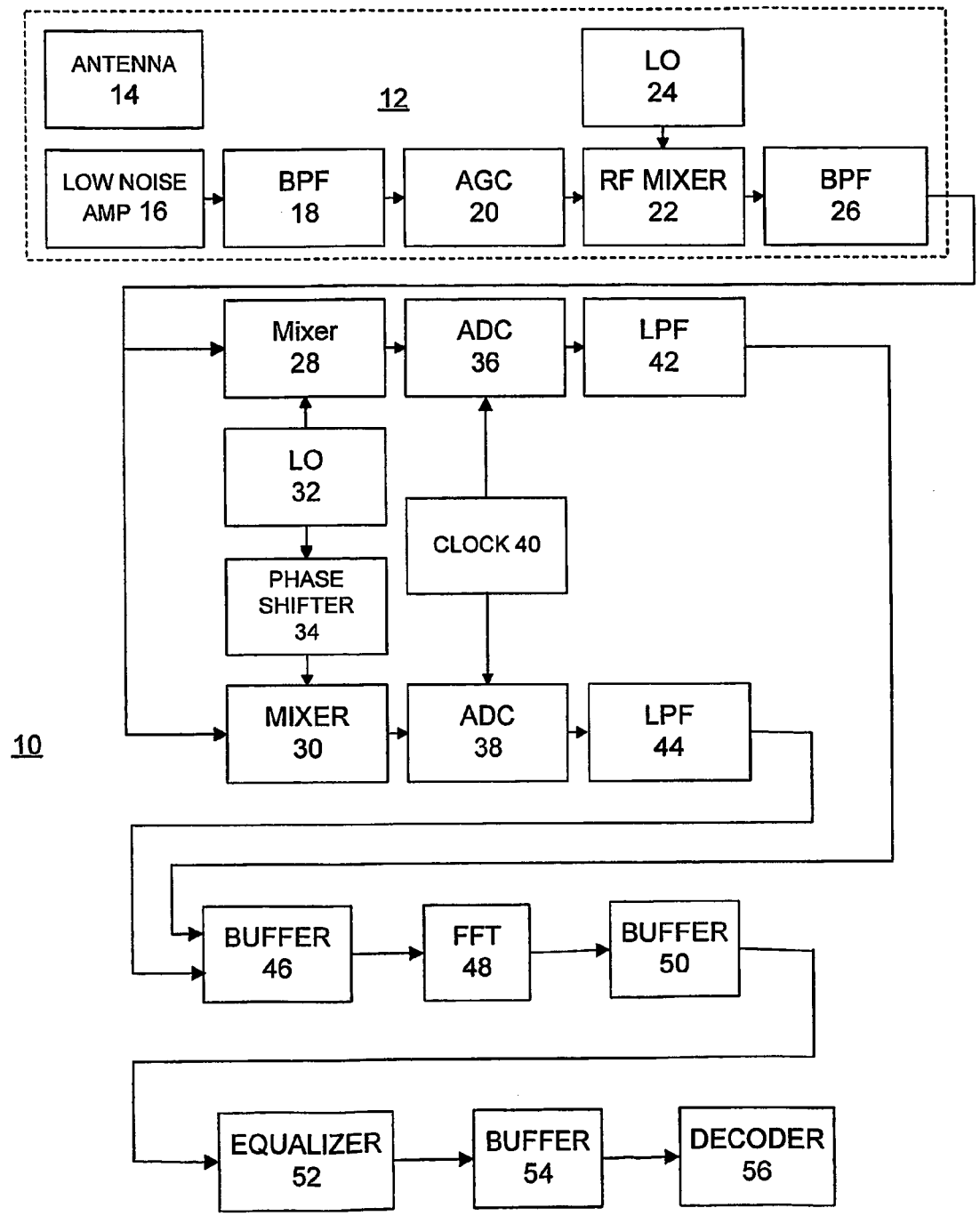
FIG. 1 is a block diagram of an exemplary OFDM receiver.

Referring to FIG. 1, the first element of a typical OFDM receiver 10 is an RF receiver 12. Many variations of the RF receiver 12 exist and are well known in the art, but typically, the RF receiver 12 includes an antenna 14, a low noise amplifier (LNA) 16, an RF band pass filter 18, an automatic gain control (AGC) circuit 20, an RF mixer 22, an RF carrier frequency local oscillator 24, and an IF band pass filter 26.

Through the antenna 14, the RF receiver 12 couples in the RF OFDM-modulated carrier after it passes through the channel. Then, by mixing it with a receiver carrier of frequency $f_{cr}$ generated by the RF local oscillator 24, the RF receiver 12 downconverts the RF OFDM-modulated carrier to obtain a received IF OFDM signal. The frequency difference between the receiver carrier and the transmitter carrier contributes to the carrier frequency offset, delta $f_c$.

This received IF OFDM signal is coupled to a mixer 28 and a mixer 30 to be mixed with an in-phase IF signal and a 90° phase-shifted (quadrature) IF signal, respectively, to produce in-phase and quadrature OFDM signals, respectively. The in-phase IF signal that feeds into the mixer 28 is produced by an IF local oscillator 32. The 90° phase-shifted IF signal that feeds into mixer 30 is derived from the in-phase IF signal of the IF local oscillator 32 by passing the in-phase IF signal through a 90° phase shifter 34 before providing it to the mixer 30.

The in-phase and quadrature OFDM signals then pass into analog-to-digital converters (ADCs) 36 and 38, respectively, where they are digitized at a sampling rate $f_{ck\_r}$ as determined by a clock circuit 40. The ADCs 36 and 38 produce digital samples that form an in-phase and a quadrature discrete-time OFDM signal, respectively. The difference between the sampling rates of the receiver and that of the transmitter is the sampling rate offset, delta $f_{ck}=f_{ck\_r}-f_{ck\_t}$.

The unfiltered in-phase and quadrature discrete-time OFDM signals from the ADCs 36 and 38 then pass through digital low-pass filters 42 and 44, respectively. The output of the low pass digital filters 42 and 44 are filtered in-phase and quadrature samples, respectively, of the received OFDM signal. In this way, the received OFDM signal is converted into in-phase ($q_i$) and quadrature ($p_i$) samples that represent the real and imaginary-valued components, respectively, of the complex-valued OFDM signal, $r_i=q_i+jp_i$. These in-phase and quadrature (real-valued and imaginary-valued) samples of the received OFDM signal are then delivered to buffer 46 before being delivered to a Fast Fourier Transform (FFT) module 48. Note that in some conventional implementations of the receiver 10, the analog-to-digital conversion is done before the IF mixing process. In such an implementation, the mixing process involves the use of digital mixers and a digital frequency synthesizer. Also note that in many conventional implementations of receiver 10, the digital-to-analog conversion is performed after the filtering.

The FFT 48 performs the Fast Fourier Transform (FFT) of the received OFDM signal in order to recover the sequences of frequency-domain sub-symbols that were used to modulate the sub-carriers during each OFDM symbol interval. The FFT 48 then delivers these sequences of sub-symbols to a buffer 50, which holds the sequences of sub-symbols until they can be processed by an equalizer 52. The equalized sub-symbol data is then delivered to a buffer 54. The buffer 54 holds the equalized sub-symbol data until it can be processed by a decoder 56.

The decoder 56 recovers the transmitted data bits from the sequences of frequency-domain sub-symbols that are delivered to it from the FFT 48. This recovery is performed by decoding the frequency-domain sub-symbols to obtain a stream of data bits which should ideally match the stream of data bits that were fed into the OFDM transmitter. This decoding process can include soft Viterbi decoding and/or Reed-Solomon decoding, for example, to recover the data from the block and/or convolutionally encoded sub-symbols.

The design of the receiver 10 is made more serial by the inclusion of the independent buffers 46, 50 and 54 in front of the FFT 48, the equalizer 52 and the decoder 56. The independent buffers 46, 50 and 54 take up additional space in the integrated circuit components that make up the FFT 48, the equalizer 52 and the decoder 56. Additionally, the independent buffers 46, 50 and 54 undesirably increase the computational overhead of the OFDM receiver 10.

Figure 2:
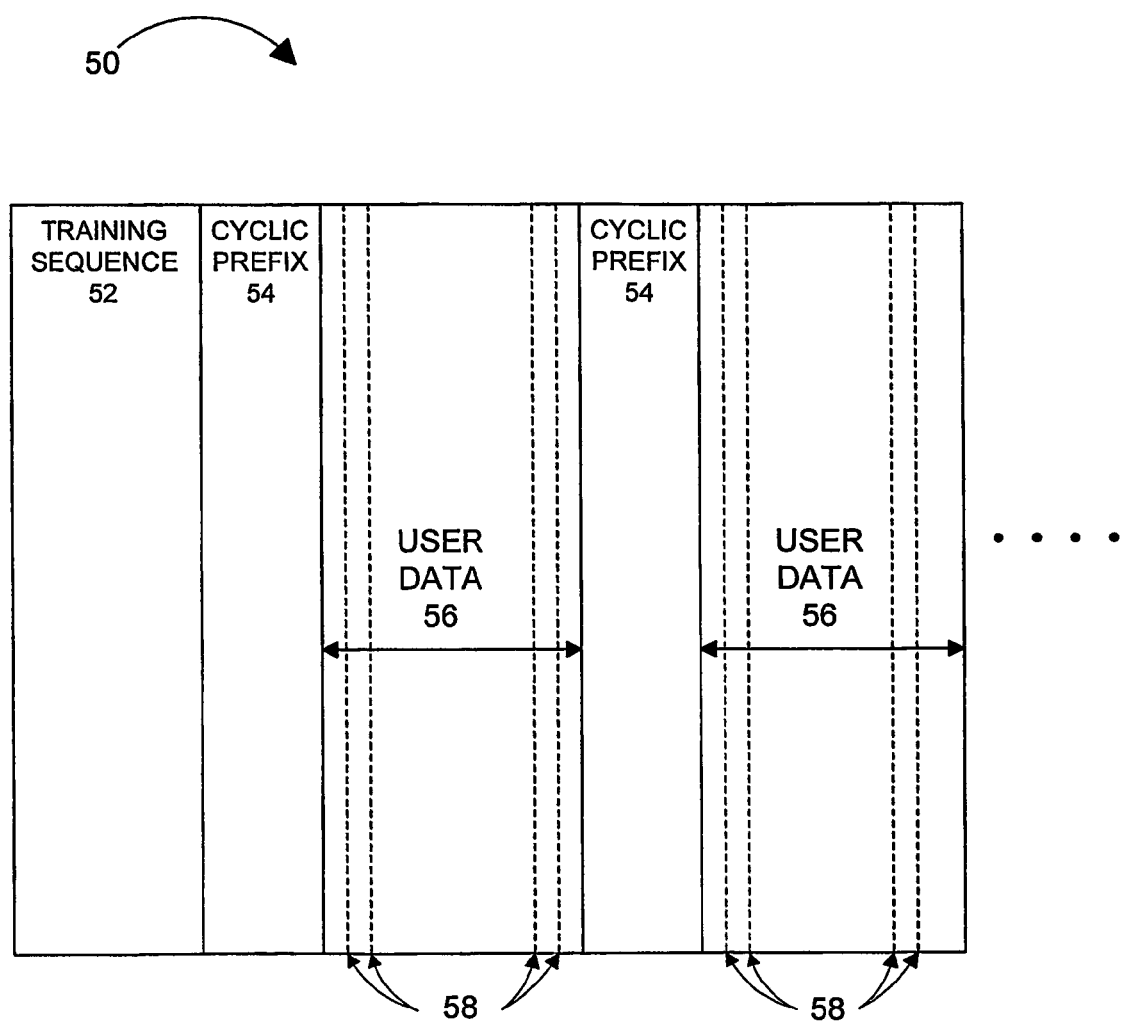
FIG. 2 is a diagram illustrating the placement of a training sequence, user data, and pilot signals within an OFDM symbol frame.

Turning to FIG. 2, an exemplary OFDM symbol frame 50 of the present invention is shown. The symbol frame 50 includes a training sequence or symbol 52 containing known transmission values for each subcarrier in the OFDM symbol, and a predetermined number of a cyclic prefix 54 and user data 56 pairs. For example, the proposed ETSI-BRAN HIPERLAN/2 (Europe) and IEEE 802.11a (USA) wireless LAN standards, herein incorporated by reference, assign 64 known values or subsymbols (i.e., 52 non-zero values and 12 zero values) to selected training symbols of a training sequence (e.g., "training symbol C" of the proposed ETSI standard and "long OFDM training symbol" of the proposed IEEE standard). The user data 56 has a predetermined number of pilots 58, also containing known transmission values, embedded on predetermined subcarriers. For example, the proposed ETSI and IEEE standards have four pilots located at bins or subcarriers ±7 and ±21. Although the present invention is described as operating in a receiver that conforms to the proposed ETSI-BRAN HIPERLAN/2 (Europe) and IEEE 802.11a (USA) wireless LAN standards, it is considered within the skill of one skilled in the art to implement the teachings of the present invention in other OFDM systems.

Figure 3:
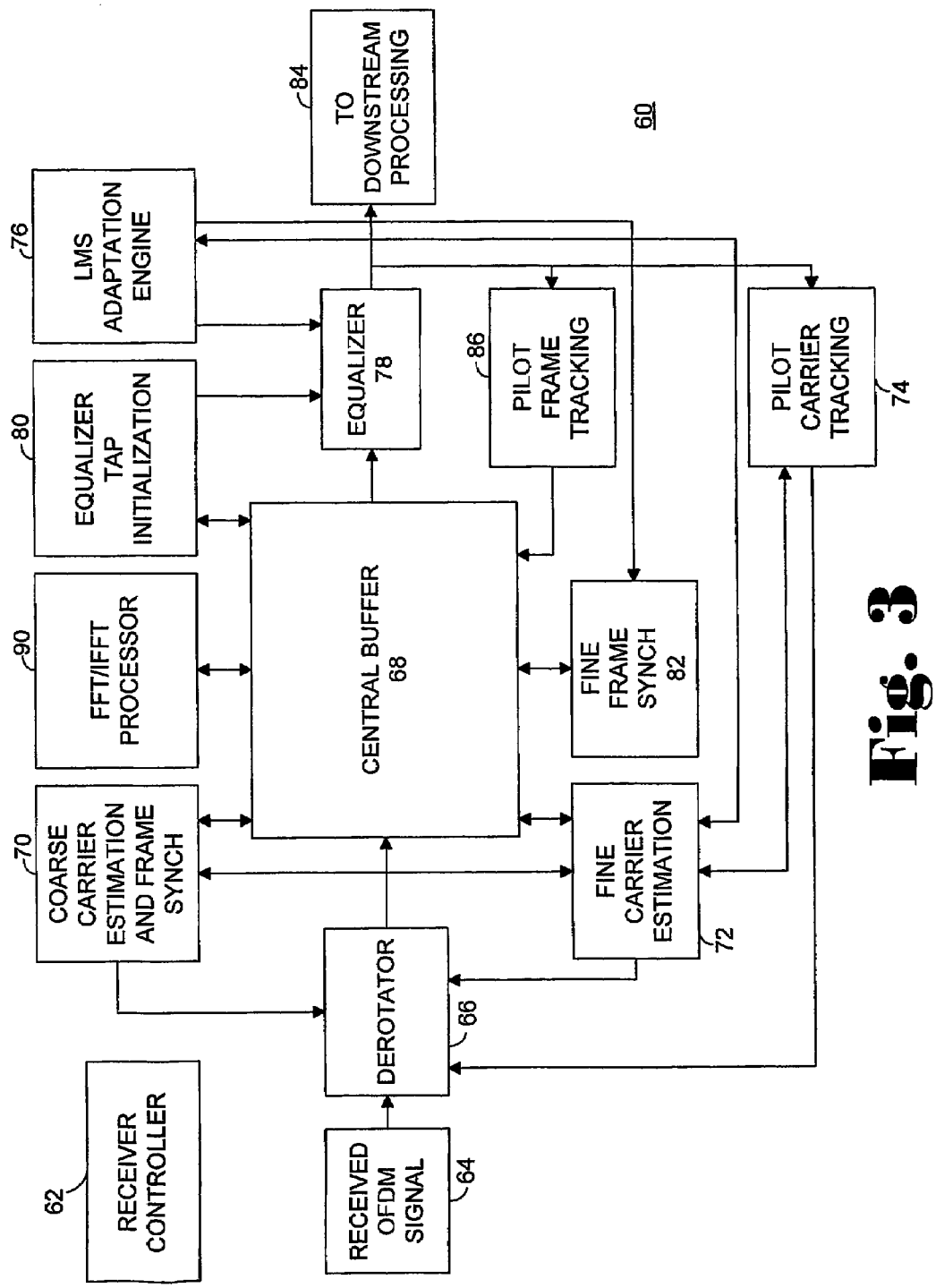
FIG. 3 is a block diagram showing a centralized buffer architecture for an OFDM receiver according to the present invention.

FIG. 3 is a block diagram showing a receiver 60 that employs a shared buffer architecture according to the present invention. Instead of using a serialized buffering approach of the OFDM receiver 10 (FIG. 1), the architecture of the receiver shown in FIG. 3 employs one central buffer that is shared by the main receiver blocks. The use of a central buffer may require a system clock rate that is faster than the data rate.

The receiver 60 includes a receiver controller module 62, which is operatively connected to all relevant functional blocks or modules in the receiver 60. The operation of the receiver controller 62 is discussed in greater detail below. For purposes of simplifying the illustration of FIG. 3, the connections between the receiver controller module 62 and the other modules is not shown.

A received OFDM signal 64 is delivered first to a derotator module 66, which is used to bring the signal to baseband (ideally) or to a frequency near baseband (in practice). The derotated OFDM signal data is then delivered to a central buffer 68 that is accessible by the surrounding functional blocks or modules of the receiver 60.

The derotator module 66 is operatively connected to receive input from a coarse carrier estimation and frame synchronization module 70, a fine carrier estimation module 72 and a pilot carrier tracking module 74. The coarse carrier estimation and frame synchronization module 70 is operatively connected to exchange data with the central buffer 68. Additionally, the coarse carrier estimation and frame synchronization module 70 is operatively coupled to provide input to the fine carrier estimation module 72. The coarse carrier estimation and frame synchronization module 70 is autocorrelation-based and may, accordingly, require a delay buffer.

The fine carrier estimation module 72 is operatively connected to exchange data with the central buffer 68. The fine carrier estimation module 72 is operatively connected to receive input from the coarse carrier estimation and frame synchronization module 70. Additionally, the fine carrier estimation module is adapted to exchange data with a pilot carrier tracking module 74 and a least mean squares (LMS) adaptation engine 76. The fine carrier estimation module 72 is autocorrelation-based and may, accordingly, require a delay buffer.

The pilot carrier tracking module 74 is operatively connected to provide input to the derotator module 66 and to receive input from an equalizer module 78. Additionally, the pilot carrier tracking module 74 is operatively connected to exchange data with the fine carrier estimation module 72. The pilot carrier tracking module 74 may be reused by the fine carrier estimation module 72 to extract the phase of the output signal of the equalizer module 78.

The LMS adaptation engine 76 is operatively connected to provide input to the equalizer module 78, an equalizer tap initialization module 80 and a fine frame synchronization module 82. The LMS adaptation engine 76 is also operatively coupled to exchange data with the fine carrier estimation module 72. In addition, the LMS adaptation engine 76 may be reused by the equalizer tap initialization block 80 to perform a recursive division operation. At least one example of such a recursive division operation is set forth in U.S. patent application Ser. No. 09/955,392 filed on Sep. 18, 2001, entitled Mechanism For OFDM Equalizer Tap Initialization Using An Adaptive Algorithm by Maxim B. Belotserkovsky and Louis Robert Litwin Jr., which is hereby incorporated by reference.

The LMS adaptation engine 76 may also be reused by the equalizer module 78 to compute LMS tap update values. Further, the LMS adaptation engine 76 may be reused by the fine frame synchronization module 82 to perform a recursive division operation. At least one example of such a recursive division operation is set forth in U.S. patent application Ser. No. 09/955,392 (incorporated by reference above).

The equalizer module 78 is operatively connected to receive data from the central buffer 68, the LMS adaptation engine 76 and the equalizer tap initialization module 80. Also, the equalizer module 78 is operatively connected to provide input to a pilot frame tracking module 86 and the pilot carrier tracking module 74. The equalizer module 78 equalizes data after the data has been processed by a Fast Fourier Transform/Inverse Fast Fourier Transform (FFT/IFFT) processor 90 and delivers output data 84 for downstream processing.

The equalizer module 78 may only require the implementation of a relatively small number of taps in hardware. The associated hardware may be reused to equalize all of the sub-bands or sub-carriers of a received OFDM signal. The central buffer 68 may serve as a storage location during this equalization process.

The equalizer tap initialization module 80 is operatively connected to receive input data from the LMS adaptation engine 76 and to provide data to the equalizer module 78. The equalizer tap initialization module 80 is also operatively connected to exchange data with the central buffer 68.

The fine frame synchronization module 82 is operatively connected to receive data from the LMS adaptation engine 76. The fine frame synchronization module 82 is also operatively connected to exchange data with the central buffer 68.

The pilot frame tracking module 86 is operatively connected to receive data from the equalizer module 78. The pilot frame tracking module 86 is also operatively connected to provide data to the central buffer 68. The use of the central buffer 68 simplifies frame tracking because all associated modules derive data from the same buffer. In order to move the FFT window location, the pilot frame tracking module 86 may change an index pointer to the central buffer 68.

The FFT/IFFT processor module 90 is operatively connected to the central buffer 68. In the illustrated embodiment, the FFT/IFFT processor module 90 comprises only the computational units (referred to as butterflies). The FFT/IFFT processor module 90 employs the central buffer 68 for data storage instead of a separate dedicated buffer. The FFT/IFFT processor 90 is adapted to receive data from the buffer, perform computations on the data and return the data to the buffer for subsequent processing.

As previously set forth, the central buffer 68 is operatively connected to exchange data with many of the functional blocks of the OFDM receiver 60. The blocks with which the central buffer 68 may exchange data include the coarse carrier estimation and frame synchronization module 70, the fine carrier estimation module 72, the fine frame synchronization module 82, the equalizer tap initialization module 80 and the FFT/IFFT processor 90. The central buffer 68 is also operatively connected to receive data from the derotator module 66 and the pilot frame tracking module 86. Finally, the central buffer 68 is operatively connected to provide data to the equalizer module 78.

In the disclosed embodiment, the central buffer 68 comprises 128 storage locations for complex number data. This size allows the buffer to store about two OFDM symbols of data. The exact size of the buffer may vary depending on design characteristics of the specific application. The exact size of the central buffer 68 is not a crucial aspect of the invention.

The receiver controller module 62 is a state machine that controls the operation of the receiver 60, including access of the various modules to the central buffer 68. In this manner, the receiver controller module 62 acts to maintain coherency of the central buffer 68. The receiver controller module 62 also controls the transfer of data from the central buffer 68 to the equalizer module 78.

During the initialization phase of the receiver 60, a preamble may be received. This preamble may comprise training symbols. An example of the types of training symbols that may be received as part of the preamble are the A, B and C training symbols referred to in the Hiperlan/2 specification.

The receiver controller module 62 allows the coarse carrier estimation and frame synchronization module 70 to operate and access the central buffer 68 during the A and B training symbol periods. The equalizer tap initialization module 80, the fine carrier estimation module 72 and the fine frame synchronization module 82 are then activated and given access to the central buffer 68 during the C training symbol period. The coarse carrier estimation and frame synchronization module 70 and the fine carrier estimation module 72 control the operation of the derotator module 66.

Following the preamble, the OFDM receiver 60 starts processing the received user data with pilots embedded in the data (see FIG. 2). During this phase of operation, the receiver controller module 62 activates the equalizer module 78, the pilot carrier tracking module 74, and the pilot frame tracking module 86.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. An Orthogonal Frequency Division Multiplexing (OFDM) receiver that is adapted to receive OFDM signals, the OFDM receiver comprising:
    a shared buffer that stores data corresponding to the OFDM signals;
    an equalizer tap initialization module that is adapted to exchange data with the shared buffer;
    a fine carrier estimation module that is adapted to exchange data with the shared buffer;
    a fine frame synchronization module that is adapted to exchange data with the shared buffer;
    an equalizer module adapted to receive data from the shared buffer and equalize the data; and
    a receiver controller that controls the transfer of data from the shared buffer to the equalizer module and allows the equalizer tap initialization module, the fine carrier estimation module and the fine frame synchronization module to access the shared buffer responsive to receipt of at least a portion of a preamble by the OFDM receiver.

2. The OFDM receiver of claim 1, comprising:
a pilot frame tracking module that is adapted to move an FFT window location by changing an index pointer to the shared buffer.

3. The OFDM receiver of claim 1, comprising:
a pilot carrier tracking module adapted to provide pilot carrier tracking data to the shared buffer; and
a fine carrier estimation module that is adapted to access the shared buffer to obtain the pilot carrier tracking data.

4. The OFDM receiver of claim 1, comprising:
an equalizer tap initialization module that is adapted to exchange data with the shared buffer; and
a least mean squares (LMS) adaptation engine that is adapted to provide input to the equalizer tap initialization module.

5. The OFDM receiver of claim 4, wherein the equalizer tap initialization module is adapted to reuse output from the LMS adaptation engine to perform a recursive division algorithm.

6. The OFDM receiver of claim 1, comprising:
a least mean squares (LMS) adaptation engine that is adapted to provide input to the equalizer module; and
wherein the equalizer module is adapted to reuse the data provided by the LMS adaptation engine to compute a least mean squares tap update value.

7. The OFDM receiver of claim 1, comprising:
a fine frame synchronization module adapted to exchange data with the shared buffer; and
a least mean squares (LMS) adaptation engine that is adapted to provide input to the fine frame synchronization module.

8. The OFDM receiver of claim 7, wherein the fine frame synchronization module is adapted to reuse output from the LMS adaptation engine to perform a recursive division algorithm.

9. The OFDM receiver of claim 1, comprising:
a coarse carrier estimation and frame synchronization module that is adapted to exchange data with the shared buffer; and
wherein the receiver controller is adapted to allow the coarse carrier estimation and frame synchronization module to access the shared buffer responsive to receipt of at least a portion of a preamble by the OFDM receiver.

10. The OFDM receiver of claim 1, comprising:
a pilot carrier tracking module that is adapted to receive data from the equalizer module;
a pilot frame tracking module that is adapted to provide data to the shared buffer; and
wherein the receiver controller is adapted to activate the equalizer module, the pilot carrier tracking module and the pilot frame tracking module responsive to the receipt of at least a portion of an OFDM signal by the OFDM receiver.

11. The OFDM receiver of claim 1, wherein the receiver controller is a state machine.

12. A device, comprising:
a shared buffer that stores data corresponding to signals;
an equalizer tap initialization module that is adapted to exchange data with the shared buffer;
a fine carrier estimation module that is adapted to exchange data with the shared buffer;
a fine frame synchronization module that is adapted to exchange data with the shared buffer;
an equalizer module adapted to receive data from the shared buffer and equalize the data; and
a device controller that controls the transfer of data from the shared buffer to the equalizer module and allows the equalizer tap initialization module, the fine carrier estimation module and the fine frame synchronization module to access the shared buffer responsive to receipt of at least a portion of a preamble signal.

13. The device of claim 12, comprising:
a pilot frame tracking module that is adapted to move an FFT window location by changing an index pointer to the shared buffer.

14. The device of claim 12, comprising:
a pilot carrier tracking module adapted to provide pilot carrier tracking data to the shared buffer; and
a fine carrier estimation module that is adapted to access the shared buffer to obtain the pilot carrier tracking data.

15. The device of claim 12, comprising:
an equalizer tap initialization module that is adapted to exchange data with the shared buffer; and
a least mean squares (LMS) adaptation engine that is adapted to provide input to the equalizer tap initialization module.

16. The device of claim 12, comprising:
a least mean squares (LMS) adaptation engine that is adapted to provide input to the equalizer module; and
wherein the equalizer module is adapted to reuse the data provided by the LMS adaptation engine to compute a least mean squares tap update value.

17. The device of claim 12, comprising:
a coarse carrier estimation and frame synchronization module that is adapted to exchange data with the shared buffer; and
wherein the device controller is adapted to allow the coarse carrier estimation and frame synchronization module to access the shared buffer responsive to receipt of at least a portion of a preamble signal.

18. The device of claim 12, comprising:
a pilot carrier tracking module that is adapted to receive data from the equalizer module;
a pilot frame tracking module that is adapted to provide data to the shared buffer; and
wherein the device controller is adapted to activate the equalizer module, the pilot carrier tracking module and the pilot frame tracking module responsive to the receipt of a signal by the device.

* * * * *